United States Patent
Subramanian (10) Patent No.: US 10,637,371 B2
(45) Date of Patent: Apr. 28, 2020

(54) INTERFACE ARRANGEMENT BETWEEN AN ALTERNATING CURRENT POWER SYSTEM AND A DIRECT CURRENT POWER SYSTEM WITH CONTROL OF CONVERTER VALVE FOR FAULT PROTECTION

(71) Applicant: ABB SCHWEIZ AG, Baden (CH)

(72) Inventor: Sasitharan Subramanian, Ludvika (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/532,386

(22) PCT Filed: Dec. 22, 2014

(86) PCT No.: PCT/EP2014/079057
§ 371 (c)(1),
(2) Date: Jun. 1, 2017

(87) PCT Pub. No.: WO2016/101985
PCT Pub. Date: Jun. 30, 2016

(65) Prior Publication Data
US 2017/0338654 A1 Nov. 23, 2017

(51) Int. Cl.
*H02M 7/757* (2006.01)
*H02M 7/483* (2007.01)

(52) U.S. Cl.
CPC .......... *H02M 7/7575* (2013.01); *H02M 7/483* (2013.01); *H02M 2007/4835* (2013.01)

(58) Field of Classification Search
CPC .............. H02M 7/7575; H02M 7/483; H02M 2007/4835
See application file for complete search history.

(56) References Cited

U.S. PATENT DOCUMENTS 3,612,973 A * 10/1971 Kuniyoshi ............... H02P 6/06
318/400.27
5,311,419 A * 5/1994 Shires .................. H02M 1/4216
363/129

(Continued)

FOREIGN PATENT DOCUMENTS

WO   WO 2011/069553 A1   6/2011
WO   WO 2014/082657 A1   6/2014
WO   WO 2014/198343 A1   12/2014

OTHER PUBLICATIONS

International Preliminary Report on patentability for PCT/EP2014/079057 dated Dec. 15, 2016.

(Continued)

*Primary Examiner* — Daniel Kessie
*Assistant Examiner* — Peter M Novak
(74) *Attorney, Agent, or Firm* — Birch, Stewart, Kolasch & Birch, LLP (57) ABSTRACT

An interface arrangement is configured to couple an alternating current, AC, power system with a direct current, DC, power system, or vice versa. The interface arrangement includes a plurality of series-connected converter modules. Each converter module includes at least one multi-level converter cell configured to provide a voltage contribution to at least a portion of an AC waveform for example based on voltage of the DC power system. Each converter module includes at least one converter valve, electrically connected to the multi-level converter cells and including at least two anti-parallel thyristors. The converter valves are switchable between conducting states with a selected current conduction direction and a non-conducting state so as to selectively control polarity of any voltage contribution provided by the at least one multi-level converter cell. The converter valves can also serve as fault protection, e.g. to divert overcurrents.

17 Claims, 7 Drawing Sheets

(56) References Cited

U.S. PATENT DOCUMENTS

| | | | | |
|---|---|---|---|---|
| 6,118,676 A | * | 9/2000 | Divan | H02J 3/1814 |
| | | | | 323/207 |
| 2002/0176261 A1 | * | 11/2002 | Norrga | F21S 10/002 |
| | | | | 362/551 |
| 2012/0127766 A1 | | 5/2012 | Crookes et al. | |
| 2013/0070495 A1 | * | 3/2013 | Jonsson | H02M 7/758 |
| | | | | 363/84 |
| 2014/0002933 A1 | * | 1/2014 | Gao | H02M 1/32 |
| | | | | 361/18 |
| 2014/0362618 A1 | | 12/2014 | Hassan | |
| 2015/0295507 A1 | * | 10/2015 | Barupati | H02M 7/487 |
| | | | | 363/35 |

OTHER PUBLICATIONS

International Search Report for PCT/EP2014/079057 dated Oct. 1, 2015.
Li et al., "Protection of Nonpermanent Faults on DC Overhead Lines in MMC-Based HVDC Systems", IEEE Transactions on Power Delivery, IEEE Service Center, New York, NY, Jan. 1, 2013, vol. 28, No. 1, pp. 483-490.
Written Opinion of the International Searching Authority for PCT/EP2014/079057 dated Oct. 1, 2015.
Indian Office Action for Indian Application No. 201747021525, dated May 30, 2019, with English translation.

* cited by examiner

Fig. 1

141-146 – multi-level converter cells
151-156 – converter valves
181-183 – commutation cell

100 - Interface arrangement
101 - Control unit
102 – AC power system
103 – DC power system
200 – Power system

INTERFACE ARRANGEMENT BETWEEN AN ALTERNATING CURRENT POWER SYSTEM AND A DIRECT CURRENT POWER SYSTEM WITH CONTROL OF CONVERTER VALVE FOR FAULT PROTECTION

TECHNICAL FIELD

The present invention generally relates to the field of power transmission systems, e.g. High Voltage Direct Current (HVDC) power transmission systems. Specifically, the present invention relates to an interface arrangement between an alternating current (AC) power system and a direct current (DC) power system, e.g. a converter station between an AC power system and a DC power system.

BACKGROUND

HVDC power transmission has become increasingly important due to increasing need for power supply or delivery and interconnected power transmission and distribution systems. Power systems such as electrical power distribution or transmission systems generally include a protection system for protecting, monitoring and controlling the operation and/or functionality of other components included in the power system, which other components hence may be referred to as protected units. Such protection systems may for example be able to detect short circuits, overcurrents and overvoltages in power lines, transformers and/or other parts or components of the power system. The protection systems can include protection equipment such as circuit breakers for isolating any possible faults for example occurring in power transmission and distribution lines by opening or tripping the circuit breakers. After the fault has been cleared, e.g. by performing repairs and/or maintenance on the component in which the fault has been detected, the power flow can be restored by closing the circuit breakers.

Interface arrangements are known to be connected between an AC power system and a DC power system. Such an arrangement typically includes a converter, such as a voltage source converter, for conversion of AC power to DC power, or vice versa. The interface arrangement has a DC side for coupling to the DC power system and an AC side for coupling to the AC power system. The arrangement often includes a transformer having a primary side connected to the AC system and a secondary side for coupling to the converter.

For example in a HVDC power system, there is generally included an interface arrangement including or constituting an HVDC converter station, which is a type of station configured to convert high voltage DC to AC, or vice versa. An HVDC converter station may comprise a plurality of elements such as the converter itself (or a plurality of converters connected in series or in parallel), one or more transformers, capacitors, filters, and/or other auxiliary elements. Converters may comprise a plurality of solid-state based devices such as semiconductor devices and may be categorized as line-commutated converters or voltage source converters, e.g. depending on the type of switches (or switching devices) which are employed in the converter. A plurality of solid-state semiconductor devices such as IGBTs may be connected together, for instance in series, to form a building block, or cell, of an HVDC converter.

For example with respect to HVDC converters for offshore applications, one concern may be the volume of the converter station, which is generally desired to be as small as possible. A reduction of the volume of the converter station will generally entail a reduction in the cost of the converter station and also for example in the cost of the offshore platform. Modular Multi-level Converters (MMCs) usually have a relatively small volume, or 'footprint' as compared to classic converters, since MMCs in general require no AC filters or DC passive filters, which usually have a relatively large volume or footprint. An MMC may for example include Cascaded Two Level (CTL) converter cells as building blocks. The converter volume is directly proportional to number of converter cells. Each CTL converter cell usually comprises two IGBTs as switches or switching devices and an electrical energy storage element. Electric energy storage elements such as capacitors in general have a relatively large volume or footprint. One possibility for reducing converter volume is reducing the number of converter cells.

SUMMARY

Different HVDC converter topologies may be used, examples of which are parallel MMC and series MMC. In HVDC converters with parallel MMC topology, the converter phase legs are electrical connected in parallel between the DC poles (with reference to a bipole arrangement of the HVDC converter), and include cascaded converter cells, which for example may be half-bridge converter cells (two-level) or full-bridge converter cells (three-level). Each phase leg usually comprises two phase arms, which may be referred to as a positive converter arm and a negative converter arm, or an upper converter arm and a lower converter arm. Each converter arm may be constructed so as to be able to withstand DC pole to DC pole voltage. In HVDC converters with series MMC topology, the converter phase legs are electrically connected in series across the DC poles (again with reference to a bipole arrangement of the HVDC converter). As for parallel MMC topology converters, each phase leg usually comprises two phase arms, which may be referred to as a positive converter arm and a negative converter arm, or an upper converter arm and a lower converter arm.

The total number of converter cells which is required for series MMC topology converters may be half or about half of the total number of converter cells required for parallel MMC topology converters. Using series MMC topology converters may hence entail a lower cost compared to using parallel MMC topology converters, based both on a reduction of the total number of required components and on a smaller volume required for the converter station. Even though by using series MMC topology converters a significant reduction in the converter volume may be achieved compared to using parallel MMC topology converters, it would be desirable with converter stations which require even less space.

In view of the above, a concern of the present invention is to provide an interface arrangement configured to couple an alternating current (AC) power system with a direct current (DC) power system which may allow for facilitate a reduction in converter volume.

To address at least one of this concern and other concerns, an interface arrangement in accordance with the independent claim is provided. Preferred embodiments are defined by the dependent claims.

According to a first aspect, there is provided an interface arrangement configured to couple an AC power system with a DC power system, or vice versa. The interface arrangement comprises a plurality of converter modules for conversion of AC power to DC power, or vice versa. The converter modules are electrically connected in series. Each converter module is configured to provide at least a portion of an AC waveform, e.g. an AC voltage waveform. Each converter module comprises at least one multi-level converter cell, wherein each multi-level converter cell is configured to provide a voltage contribution to the AC voltage waveform, e.g. based on voltage of the DC power system. Each converter module comprises at least one converter valve electrically connected to the at least one multi-level converter cell. The interface arrangement is configured or arranged such that the at least one converter valve is controllably switchable between conducting states with a selected current conduction direction and a non-conducting state, so as to selectively control polarity of any voltage contribution provided by the at least one multi-level converter cell. The at least one converter valve includes at least two anti-parallel thyristors.

The interface arrangement may for example be included in or constitute a converter station, e.g. a HVDC converter station.

By way of the converter modules, each of which comprises at least one multi-level converter cell, being electrically connected in series, the interface arrangement employs a series MMC topology. Compared to employing parallel MMC topology, a reduction in the converter volume may be achieved. In turn, this may allow for a relatively low cost for the interface arrangement, and further for a reduced cost of any installation in which the interface arrangement is employed, e.g. as an HVDC converter in offshore applications. Further, by way of the converter modules comprising multi-level converter cells, the interface arrangement can operate according to MMC principles, whereby the total converter volume may be kept relatively low since MMCs in general require no AC filters or DC passive filters.

Each multi-level converter cell is configured to provide a voltage contribution to an AC voltage waveform based on, e.g., voltage of the DC power system. The multi-level converter cells can hence be used in order to synthesize a desired AC voltage waveform to satisfy the requirements of either the AC power system or the DC power system. The interface arrangement can hence be operated as a Voltage Source Converter, wherein DC side voltage establishes the AC side voltage.

The at least one converter valve may in alternative be referred to as a director valve, or AC waveform shaper, since the at least one converter valve can selectively control polarity of any voltage contribution provided by the at least one multi-level converter cell. Compared to using converter valves including switches or switching devices such as an IGBT together with an anti-parallel diode, use of at least one converter valve including at least two anti-parallel thyristors may offer several advantages.

For example, during certain circumstances, generally during abnormal circumstances such as during a fault in the DC power system, in the interface arrangement, and/or in the DC power system, there may be relatively high currents, and hence voltages, which components of the interface arrangement may be subjected to. For example during a single phase to negative DC pole fault on the AC side or AC bus of the converter modules (e.g. in a current path between the converter modules and a transformer arranged between the converter modules and the AC power system), an upper, or positive, converter arm of at least one of the converter modules (e.g. one closest to a DC pole) may be directly exposed to a relatively high DC voltage due to the fault current, which DC voltage may charge an electrical energy storage element such as a capacitor in the converter arm. For example in a bipolar, multi-phase configuration, this may apply to the upper, or positive, converter arm of the converter module closest to the positive DC pole and also to the lower, negative converter arm of the converter module closest to the negative DC pole. One solution for handling such a situation is to overrate the electrical energy storage element so as to have the capability to handle such high DC voltages that may possibly occur. However, overrating of electrical energy storage elements such as capacitors in converter arms may increase both the total volume of the converter station as well as its cost.

By means of the at least one converter valve including at least two anti-parallel thyristors, current can be selectively routed through the at least one converter valve for example so as to selectively bypass a converter cell or converter cell arm, as required or desired depending on the circumstances. This is in contrast to using converter valves including switches or switching devices such as an IGBT together with an anti-parallel diode, which may offer no or limited capability of selective routing of current so as to bypass another component. For example during a single phase to negative DC pole fault on the AC side or AC bus of the converter modules as mentioned in the foregoing, the at least one converter valve can be used to route a fault current through the at least one converter valve so as to bypass for example an upper, or positive, converter arm of at least one of the converter modules, thereby avoiding possibly overcharging of electrical energy storage element(s) such as a capacitor in the converter module, whereby the need for overrating such electrical energy storage element(s) in the converter module may be reduced or even avoided. Thus, by means of the at least one converter valve including at least two anti-parallel thyristors, the total volume of the converter station as well as its cost may be kept relatively low.

The plurality of converter modules may be electrically connected in series for example between a first DC pole and a second DC pole, or between a DC pole and ground.

The interface arrangement may comprise a control unit configured to control operation of one or more other components of the interface arrangement. For example, the control unit may be configured to control the at least one converter valve at least with respect to switching thereof.

In case of occurrence of a fault in the power system, such as for example a DC link fault, the anti-parallel thyristors of the at least one converter valve can be used to control the fault current path within the interface arrangement, i.e. to selectively route the fault current within the interface arrangement, by means of controlled switching of the anti-parallel thyristors in the at least one converter valve, so as to selectively switch the at least one converter valve between conducting states with a selected current conduction direction and a non-conducting state.

For example, the control unit may be configured to, in response to receiving an indication indicating presence of a fault current in the interface arrangement, control switching of the at least one converter valve so as to route the fault current through the at least one converter valve and bypass at least a portion of the at least one multi-level converter cell. Preferably, any electrical energy storage element(s) such as a capacitor in the at least one multi-level converter cell can be bypassed in this way, so as to avoid overcharging of the electrical energy storage element(s) due to the fault current. The indication indicating presence of a fault current in the interface arrangement may for example be transmitted to the control unit by from some protection system or module for protecting, monitoring and controlling the operation and/or functionality of components included in the power system.

The indication may be transmitted using a wired and/or wireless communication path as known in the art. The fault may for example be a fault at one of the first DC pole and the second DC pole, or a single phase to negative DC pole fault on the AC side or AC bus of the converter modules. The control unit may be configured to, in response to receiving an indication indicating presence of a fault current in the interface arrangement caused by a fault at one of the first DC pole and the second DC pole, control switching of the at least one converter valve so as to route the fault current from the one of the first DC pole and the second DC pole at which there is a fault through the at least one converter valve to the other one of the first DC pole and the second DC pole, while bypassing the at least a portion of the at least one multi-level converter cell. For example during a single phase to negative DC pole fault on the AC side or AC bus of the converter modules, the at least one converter valve can be used to route a fault current through the at least one converter valve so as to bypass for example an upper, or positive, converter arm of at least one of the converter modules, thereby avoiding possibly overcharging of electrical energy storage element(s) such as a capacitor in the converter module. The fault current can then be routed for example via a diode of the lower, or negative, converter arm of the converter module. The diode surge current rating is preferably based on or defined by an estimated maximum fault current. The bypassing of the converter arm may be carried out until an AC circuit breaker arranged in a current path between the AC side, or AC bus, of the converter modules and the AC power system has been tripped, or opened.

As mentioned in the foregoing, the at least one converter valve is controllably switchable between conducting states with a selected current conduction direction and a non-conducting state, so as to selectively control polarity of any voltage contribution provided by the at least one multi-level converter cell. Switching of the at least one converter valve may for example be based on a fundamental frequency of the AC power system. Switching of the at least one converter valve may for example be carried out by means of, or based on, generating control signals in a manner as such known in the art (e.g. by a control unit) and supplying the control signals to the (thyristors of the) at least one converter valve.

For example, the at least one converter valve may be switched such that current is commutated from one of the thyristors in the pair of anti-parallel thyristors to the other thyristor, and the switching is preferably controlled such that current commutates from one thyristor to the other seamlessly, and in principle under any load and power factor condition. The switching of the at least one converter valve such that current is commutated from one of the thyristors in the pair of anti-parallel thyristors to the other thyristor may be carried out at zero voltage or at a relatively low voltage, whereby switching losses can be kept relatively low. Thus, in view of the at least one converter valve comprising anti-parallel thyristors, switching of the (thyristors of the) at least one converter valve may be carried out at a relatively low frequency, current and/or voltage, which may be referred to as 'soft switching', and so there may be relatively small changes in voltage and/or current during a given period of time, whereby switching losses can be kept relatively low. Also, thyristors generally have low conduction losses as compared to for example IGBTs.

The at least one converter valve includes at least two anti-parallel thyristors, and may according to one or more embodiments of the present invention only include anti-parallel thyristor pairs, or only include switching elements that are not self-commutated. Therefore, the interface arrangement is configured such that the at least one converter valve is controllably switchable between conducting states with a selected current conduction direction and a non-conducting state, so as to selectively control polarity of any voltage contribution provided by the at least one multi-level converter cell. To that end, the interface arrangement, or possibly each converter module, may for example comprise at least one commutation cell, which is electrically connected to the DC power system and electrically connected to the at least one converter valve. The commutation cell may be switchable so as to selectively cause at least one converter valve, e.g. the at least one converter valve of a converter module in which the commutation cell is included, or with which the commutation cell is associated, to enter the non-conducting state. That is, the commutation cell may provide voltage for forced commutation of the (thyristors of the) at least one converter valve.

The AC power system may comprise a plurality of phases. Each converter module may correspond to one of the phases. The correspondence between the converter modules and the phases may be one-to-one, and so there may be a separate, or particular converter module corresponding to each phase. The interface arrangement may hence be a multi-phase arrangement.

The plurality of converter modules, which are electrically connected to the DC power system, may for example be electrically connected in series between a first DC pole and a second DC pole, or between a DC pole and ground. Thus, the interface arrangement may for example be configured according to a monopole configuration, or a bipole configuration. The interface arrangement is however not limited thereto, but may for example in alternative be configured according to an asymmetrical monopole configuration.

In the context of the present application, by a multi-level converter cell it is meant a converter cell that is configured so as to be capable of providing a multiple of (two or more) voltage levels, which may be used in forming an AC voltage (waveform).

A multi-level converter cell may for example comprise a half-bridge, or two-level, cell or a full-bridge, or three-level, cell.

A multi-level converter cell may for example comprise at least one capacitor, and/or another type of electrical energy storage element, electrically connected, e.g. in parallel, with a series connection of switching elements, e.g. including Integrated Gate-Commutated Transistor (IGBT)-diode pairs, each IGBT-diode pair comprising one or more IGBTs and a diode arranged in anti-parallel fashion with respect to the IGBT(s).

In the context of the present application, by anti-parallel (or inverse-parallel) electrical devices such as thyristors, it is meant devices which are electrically connected in parallel but with their polarities reversed with respect to each other. Thus, in the context of the present application, by anti-parallel thyristors, it is meant thyristors which are arranged in anti-parallel fashion with respect to each other.

The interface arrangement may comprise a DC side for coupling of the interface arrangement to the DC power system and an AC side for coupling of the interface arrangement to the AC power system. The AC side and/or the DC side may for example include at least one terminal.

In the context of the present application, by a non-conducting state of a converter valve it is meant a state where there is no or only very little conduction of current through the converter valve. Thus, the commutation cell may be switchable so as to (substantially) stop the converter valve from conducting current.

The at least one commutation cell may for example comprise at least one electrical energy storage element, e.g. a capacitor, which can be selectively charged with DC power from the DC power system and selectively discharged. By switching of the commutation cell it may provide a selected voltage across at least one of the thyristors in the converter valve in order to switch the at least one thyristor into a non-conducting state. The other thyristor(s) in the converter valve may be in a conducting state. Thereby, the converter valve may be switched to a conducting state with a selected current conduction direction.

A multi-level converter cell may for example comprise at least one electrical energy storage element, e.g. a capacitor, which can be selectively charged with DC power from the DC power system and selectively discharged. Each multi-level converter cell may be configured to provide a voltage contribution to the AC voltage waveform based on a voltage of the electrical energy storage element, e.g. the voltage across the electrical energy storage element.

At least one, or each, converter module may comprise a plurality of multi-level converter cells electrically connected in a multi-level converter cell arm, and/or a plurality of converter valves electrically connected in a converter valve arm. At least one transformer may be connected between the AC power system and a midpoint of the converter valve arm and a midpoint of the multi-level converter cell arm. The multi-level converter cell arm and the converter valve arm may for example be electrically connected in parallel.

According to one or more embodiments of the present invention, at least one of the multi-level converter cells in a multi-level converter cell arm may comprise a full-bridge cell. According to one example, the at least one commutation cell may comprise or be constituted by the at least one multi-level converter cell which comprises a full-bridge cell. According to another example, each of the plurality of multi-level converter cells in the multi-level converter cell arm may comprise a full-bridge cell, and the at least one commutation cell may comprise or be constituted by any one of the multi-level converter cells in the multi-level converter cell arm. According to the latter example, the commutation cell can hence comprise or be constituted by any one of the multi-level converter cells available in the multi-level converter cell arm.

According to a second aspect, there is provided a converter station configured to couple an AC power system with a DC power system. The converter station includes or is constituted by an interface arrangement according to the first aspect. The converter station may for example be included in or be constituted by a HVDC converter station.

According to a third aspect, there is provided a power system which includes an AC power system and a DC power system. The power system according to the third aspect comprises an interface arrangement according to the first aspect, configured to couple the AC power system with the DC power system. The power system may for example include an HVDC power system and/or a DC grid.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments are provided by way of example so that this disclosure will convey the scope of the present invention to those skilled in the art.

Figure 1:
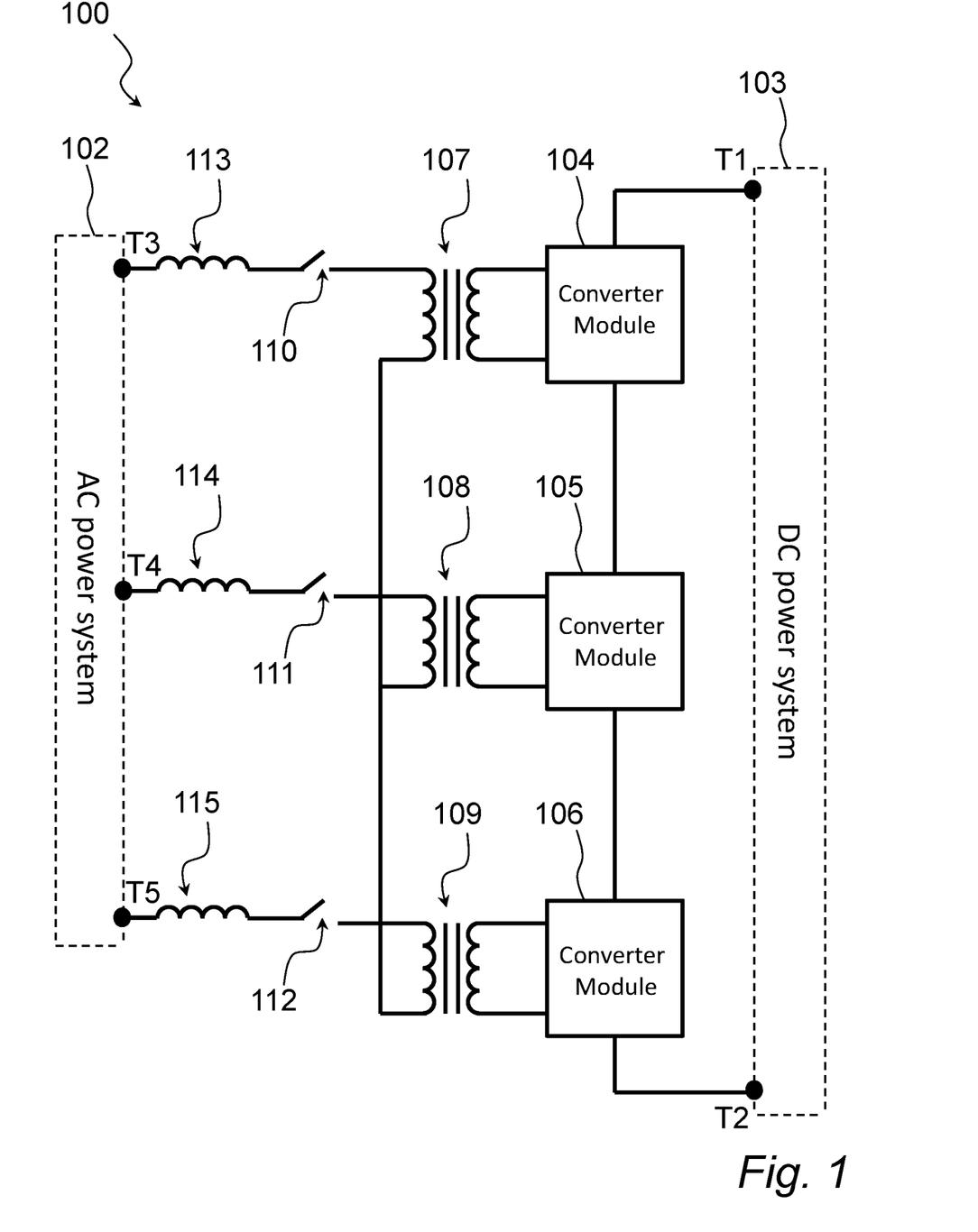
FIG. 1 is a schematic circuit diagram of an interface arrangement according to an embodiment of the present invention.

FIG. 1 is a schematic circuit diagram of an interface arrangement 100 according to an embodiment of the present invention. The interface arrangement 100 is configured to couple an AC power system 102 with a DC power system 103, or vice versa. The interface arrangement 100, the AC power system 102 and the DC power system 103 may be included in or constitute a power system. The interface arrangement 100 comprises three converter modules 104, 105, 106 for conversion of AC power to DC power, or vice versa.

The converter modules 104, 105, 106 are electrically connected in series. For example, in accordance with the embodiment of the present invention illustrated in FIG. 1, the converter modules 104, 105, 106 may be electrically connected in series between a first DC pole or terminal T1 and a second DC pole or terminal T2. The first DC pole or terminal T1 may be at DC voltage $+U_d$. The second DC pole or terminal T2 may be at DC voltage $-U_d$. Alternatively or in addition (not indicated in FIG. 1), the converter modules 104, 105, 106 may be electrically connected in series between DC pole and ground. Thus, the interface arrangement 100 may for example be configured according to a monopole configuration, or a bipole configuration, or an asymmetrical monopole configuration.

Each of the converter modules 104, 105, 106 may be configured to provide at least a portion of an AC waveform, e.g. an AC voltage waveform. To that end, each of the converter modules 104, 105, 106 may comprise at least one multi-level converter cell (not shown in FIG. 1), wherein each multi-level converter cell is configured to provide a voltage contribution to the AC voltage waveform, e.g. based on (at least) voltage of the DC power system.

The AC power system 102 may comprise a plurality of phases. According to an example, the AC power system 102 may be a three-phase power system. In accordance with the embodiment of the present invention illustrated in FIG. 1, the AC power system 102 is a three-phase power system, comprising three conductors or phases for coupling the AC power system 102 with the DC power system 103, or vice versa, and each of the converter modules 104, 105, 106 corresponds to one phase, such that there is a one-to-one correspondence between the converter modules 104, 105, 106 and the three phases. However, it is to be understood that the number of phases as well as the number of converter modules as illustrated in FIG. 1 (and also in FIG. 2 described in the following) are according to examples, and that in principle any number of phases and any number of converter modules are possible, e.g. one or two phases, and/or two or four converter modules.

As illustrated in FIG. 1, the (three) phases, and the (three) converter modules 104, 105, 106 may be electrically connected in series on the DC side so as to share the DC link voltage.

The interface arrangement 100 may comprise a transformer, which may comprise a primary side for coupling of the transformer to the AC power system 102 and a secondary side for coupling of the transformer to the converter modules 104, 105, 106. In accordance with the embodiment of the present invention illustrated in FIG. 1, the transformer is a three-phase transformer, which can be considered as comprising three (separate) 'phase transformers' 107, 108, 109, one for each phase. Each of the phase transformers 107, 108, 109 may comprise a primary side for coupling of phase the transformer 107, 108, 109 to the AC power system 102 and a secondary side for coupling of the phase transformer 107, 108, 109 to the respective converter modules 104, 105, 106. The primary side of the respective phase transformers 107, 108, 109 may comprise a set of primary windings, arranged to be coupled to the AC power system 102. The secondary side of the respective phase transformers 107, 108, 109 may comprise a set of secondary windings, arranged to be coupled to the respective converter modules 104, 105, 106. Each of the phase transformers 107, 108, 109 may be controlled and/or operated independently of the others.

The interface arrangement 100 may comprise a circuit breaker arranged in a current path between the AC side, or AC bus, of the converter modules 104, 105, 106 and the AC power system 102. Hence, the circuit breaker may be an AC circuit breaker. In accordance with the embodiment of the present invention illustrated in FIG. 1, the circuit breaker can be considered as comprising three (separate) 'phase circuit breakers' 110, 111, 112, one for each phase. Further in accordance with the embodiment of the present invention illustrated in FIG. 1, the phase circuit breakers 110, 111, 112 may be arranged in a current path between the respective phase transformers 107, 108, 109 and the AC power system 102. Each of the phase circuit breakers 110, 111, 112 is configured to controllably effect discontinuation of flow of current in the current path upon opening of contacts (not shown in FIG. 1) of the phase circuit breaker 110, 111, 112. The phase circuit breakers 110, 111, 112 may for example be arranged in a current path between the set of primary windings of the respective phase transformers 107, 108, 109 and the AC power system 102. Each of the phase circuit breakers 110, 111, 112 may possibly be controlled and/or operated independently of the others.

As illustrated in FIG. 1, each of the phases may include a reactor or inductor 113, 114, 115 arranged in a current path between the respective phase transformers 107, 108, 109 and the AC power system 102. For example, according to FIG. 1, the reactors or inductors 113, 114, 115 may be arranged in a current path between the respective phase circuit breakers 110, 111, 112 and the AC power system 102.

Further as illustrated in FIG. 1, each of the phases may be coupled to the AC power system 102 by way of terminals T3, T4 and T5, respectively.

It is to be understood that various components which are not illustrated in FIG. 1 may be included in the interface arrangement 100. Such components, which thus are not shown in FIG. 1, may for example include resistors, capacitors, filters, additional transformers and/or other auxiliary elements.

Figure 2:
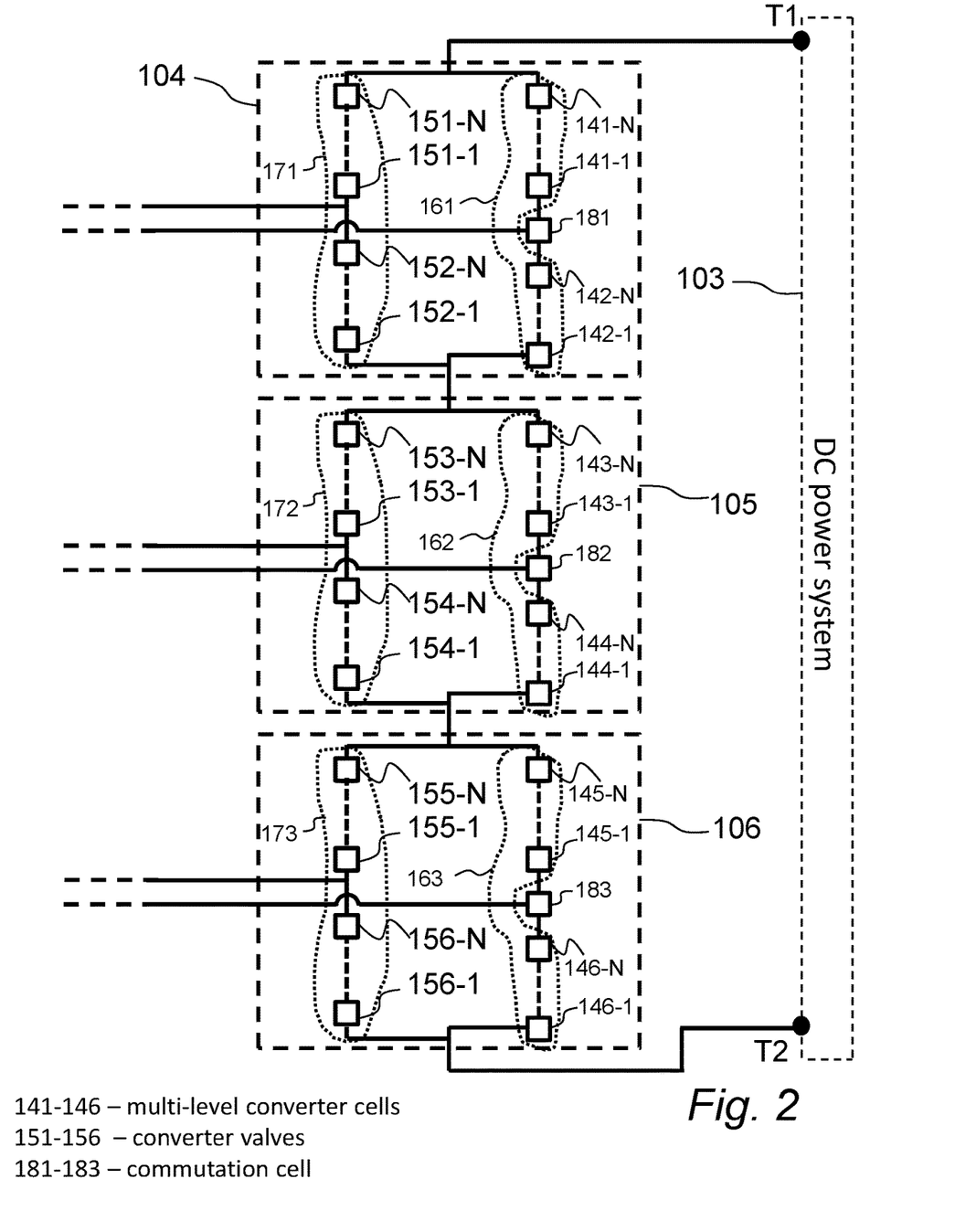
FIG. 2 is a schematic circuit diagram of a portion of an interface arrangement in accordance with an embodiment of the present invention.

FIG. 2 is a schematic circuit diagram of a portion of the interface arrangement 100 illustrated in FIG. 1, illustrating an exemplary configuration of the converter modules 104, 105, 106. As mentioned in the foregoing with respect to FIG. 1, each of the converter modules 104, 105, 106 may be configured to provide at least a portion of an AC waveform, e.g. an AC voltage waveform. To that end, each of the converter modules 104, 105, 106 may comprise a plurality of multi-level converter cells, each multi-level converter cell being configured to provide a voltage contribution to the AC voltage waveform, e.g. based on (at least) voltage of the DC power system 103.

The converter module 104 may include a plurality of multi-level converter cells 141-1, . . . , 141-N and 142-1, . . . , 142-N, electrically connected, e.g. in series as illustrated in FIG. 2, and arranged in a multi-level converter cell arm 161. The multi-level converter cells 141-1, . . . , 141-N of the multi-level converter cell arm 161 constitute an upper multi-level converter cell arm of the converter module 104, and the multi-level converter cells 142-1, . . . , 142-N of the multi-level converter cell arm 161 constitute a lower multi-level converter cell arm of the converter module 104.

Similarly, the converter module 105 may include a plurality of multi-level converter cells 143-1, . . . , 143-N and 144-1, . . . , 144-N, electrically connected, e.g. in series as illustrated in FIG. 2, and arranged in a multi-level converter cell arm 162. The multi-level converter cells 143-1, . . . , 143-N of the multi-level converter cell arm 162 constitute an upper multi-level converter cell arm of the converter module 105, and the multi-level converter cells 144-1, . . . , 144-N of the multi-level converter cell arm 162 constitute a lower multi-level converter cell arm of the converter module 105.

Similarly, the converter module 106 may include a plurality of multi-level converter cells 145-1, . . . , 145-N and 146-1, . . . , 146-N, electrically connected, e.g. in series as illustrated in FIG. 2, and arranged in a multi-level converter cell arm 163. The multi-level converter cells 145-1, . . . , 145-N of the multi-level converter cell arm 163 constitute an upper multi-level converter cell arm of the converter module 106, and the multi-level converter cells 146-1, . . . , 146-N of the multi-level converter cell arm 163 constitute a lower multi-level converter cell arm of the converter module 106.

In the embodiment of the present invention illustrated in FIG. 2, the upper multi-level converter cell arm and the lower multi-level converter cell arm of the converter modules 104, 105, 106 each includes N multi-level converter cells, where N is an integer, such as ten, fifteen, or twenty. However, it is to be understood that each of the converter modules 104, 105, 106 may include in principle any number of multi-level converter cells. According to an example, each of the converter modules 104, 105, 106 may include a single multi-level converter cell.

Figure 3:
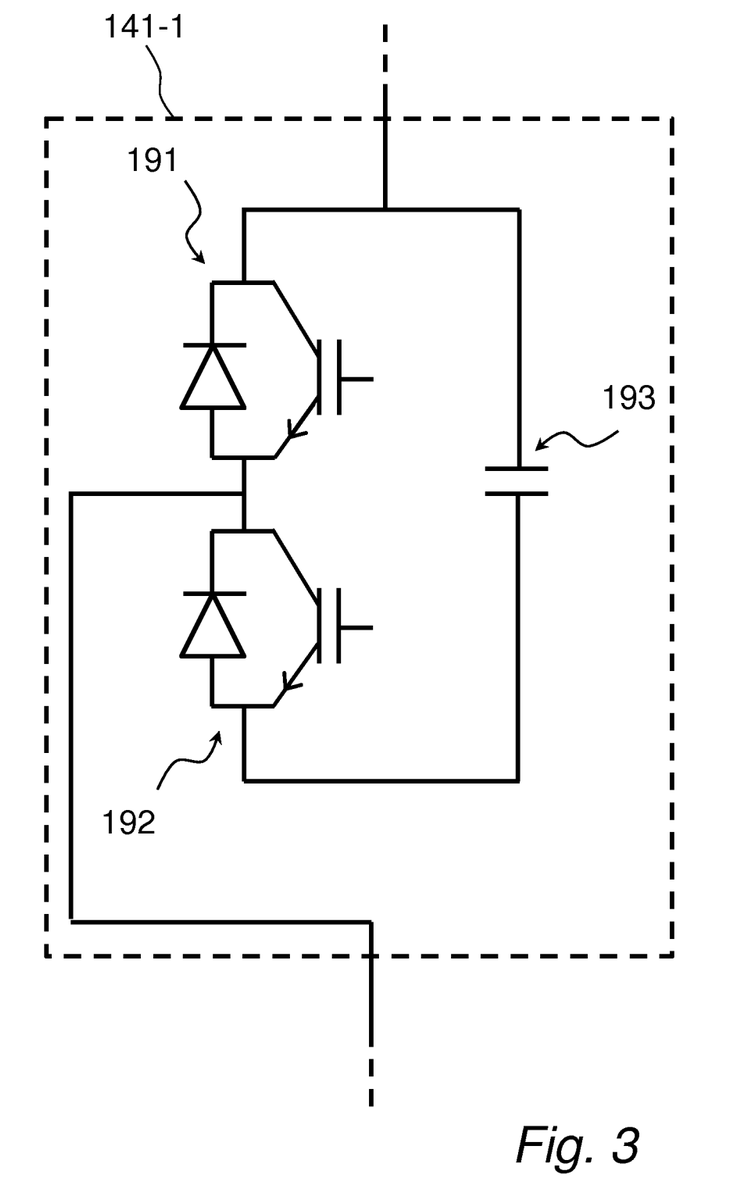
FIG. 3 is a schematic circuit diagram of a multi-level converter cell in accordance with an embodiment of the present invention.

Referring now to FIG. 3, there is shown an example configuration of the multi-level converter cell 141-1 shown in FIG. 2. It is to be understood that any one of the other multi-level converter cells 141-N, 142-1, ..., 142-N, 143-1, ..., 143-N, 144-1, ..., 144-N, 145-1, ..., 145-N, 146-1, ..., 146-N shown in FIG. 2 may be configured in the same manner or in a similar manner as the multi-level converter cell 141-1 illustrated in FIG. 3. According to the example illustrated in FIG. 3, the multi-level converter cell 141-1 comprises two switches or switching elements 191, 192 and a capacitor 193. According to the example illustrated in FIG. 3, each of the switches or switching elements 191, 192 comprises a transistor together with a diode. The transistors may for example comprise insulated gate bipolar transistors (IGBTs). It is to be understood that the switching elements 191, 192 shown in FIG. 3 are according to an example, and that other types of switching elements can be used. Also, the multi-level converter cell 141-1 is not limited to using a capacitor 193 as electrical energy storage element, but other types of electrical energy storage elements may be employed. With reference to FIG. 2, the capacitor 193 can be selectively charged with DC power from the DC power system 103 and selectively discharged. The multi-level converter cell 141-1 can thereby be controlled so as to provide a voltage contribution to the AC voltage waveform based on a voltage of the capacitor 193 (or another electrical energy storage element).

Figure 4:
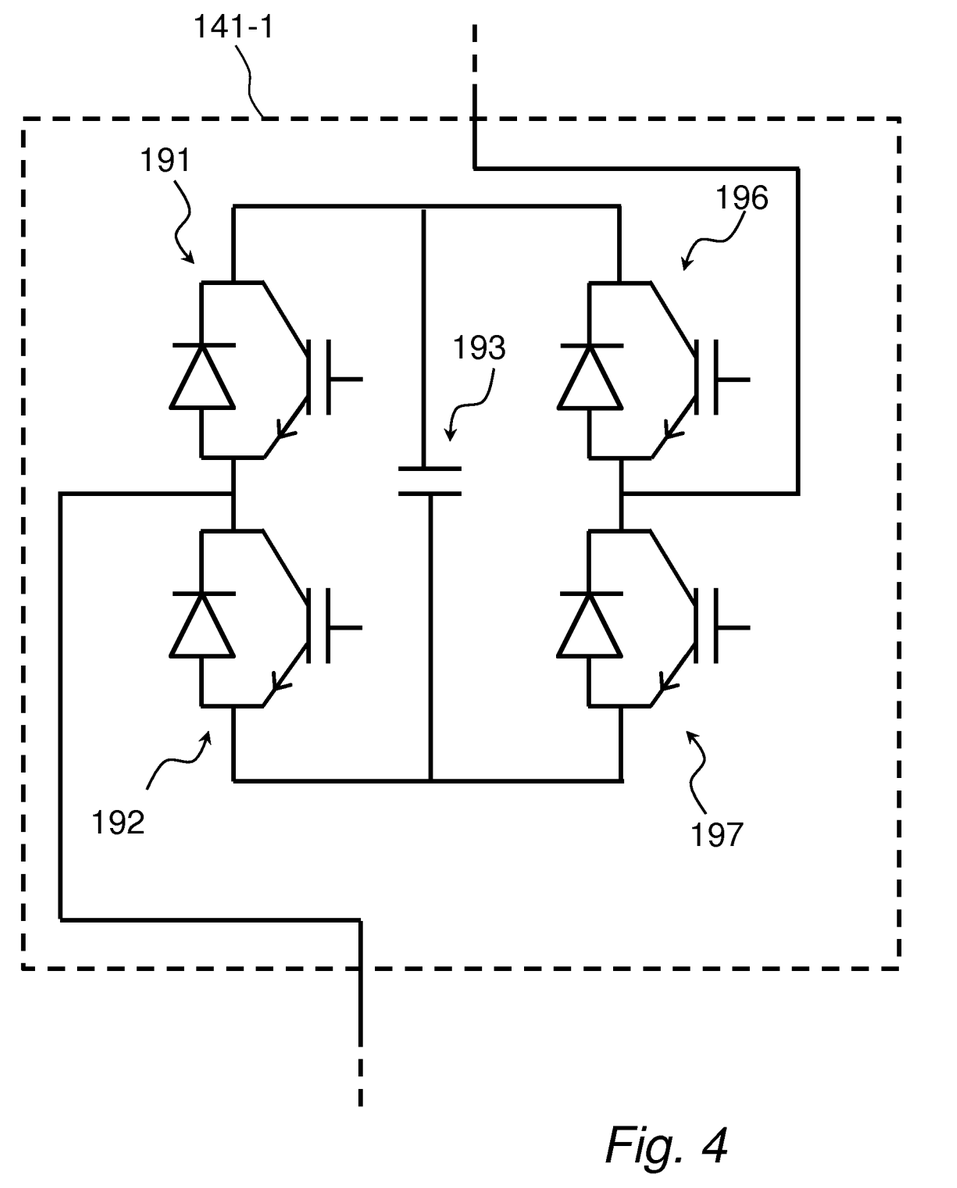
FIG. 4 is a schematic circuit diagram of a multi-level converter cell in accordance with an embodiment of the present invention.

FIG. 3 illustrates the multi-level converter cell 141-1 configured as a half-bridge circuit, wherein the two switches or switching elements 191, 192 are connected in series across the electrical energy storage element 193, with a midpoint connection between the switches or switching elements 191, 192 and one of the electrical energy storage element 193 terminals as external connections. However, it is to be understood that this configuration is according to a non-limiting example and that variations are possible. For example, the multi-level converter cell 141-1 could be configured as a full-bridge circuit. Configuring the multi-level converter cell 141-1 as a full-bridge circuit may allow for or facilitate insertion of the electrical energy storage element 193 into the circuit in either polarity. FIG. 4 illustrates the multi-level converter cell 141-1 configured as a full-bridge circuit. The multi-level converter cell 141-1 illustrated in FIG. 4 comprises four switches or switching elements 191, 192, 196, 197, each comprising a transistor (e.g., an IGBT) together with a diode. The multi-level converter cell 141-1 illustrated in FIG. 4 further comprises an electrical energy storage element in the form of a capacitor 193.

With further reference to FIG. 2, any one of the multi-level converter cells 141-1, ..., 141-N, 142-1, ..., 142-N, 143-1, ..., 143-N, 144-1, ..., 144-N, 145-1, ..., 145-N and 146-1, ..., 146-N may for example comprise a half-bridge, or two-level, cell or a full-bridge, or three-level, cell.

With further reference to FIG. 2, each of the converter modules 104, 105, 106 may comprise a plurality of converter valves. The plurality of converter valves are electrically connected to the multi-level converter cells and are controllably switchable between conducting states with a selected current conduction direction and a non-conducting state, so as to selectively control polarity of any voltage contribution provided by the respective multi-level converter cells.

The converter module 104 may include a plurality of converter valves 151-1, ..., 151-N and 152-1, ..., 152-N electrically connected, e.g. in series as illustrated in FIG. 2, and arranged in a converter valve arm 171. The converter valves 151-1, ..., 151-N of the converter valve arm 171 constitute an upper converter valve arm of the converter module 104, and the converter valves 152-1, ..., 152-N of the converter valve arm constitute a lower converter valve arm of the converter module 104.

Similarly, the converter module 105 may include a plurality of converter valves 153-1, ..., 153-N and 154-1, ..., 154-N electrically connected, e.g. in series as illustrated in FIG. 2, and arranged in a converter valve arm 172. The converter valves 153-1, ..., 153-N of the converter valve arm 172 constitute an upper converter valve arm of the converter module 105, and the converter valves 154-1, ..., 154-N of the converter valve arm constitute a lower converter valve arm of the converter module 105.

Similarly, the converter module 106 may include a plurality of converter valves 155-1, ..., 155-N and 156-1, ..., 156-N electrically connected, e.g. in series as illustrated in FIG. 2, and arranged in a converter valve arm 173. The converter valves 155-1, ..., 155-N of the converter valve arm 173 constitute an upper converter valve arm of the converter module 106, and the converter valves 156-1, ..., 156-N of the converter valve arm constitute a lower converter valve arm of the converter module 106.

In the embodiment of the present invention illustrated in FIG. 2, the upper converter valve arm and the lower converter valve arm of the converter modules 104, 105, 106 each includes N converter valves, where N is an integer, such as ten, fifteen, or twenty. However, it is to be understood that each of the converter modules 104, 105, 106 may include in principle any number of converter valves. According to an example, each of the converter modules 104, 105, 106 may include a single converter valve.

Figure 5:
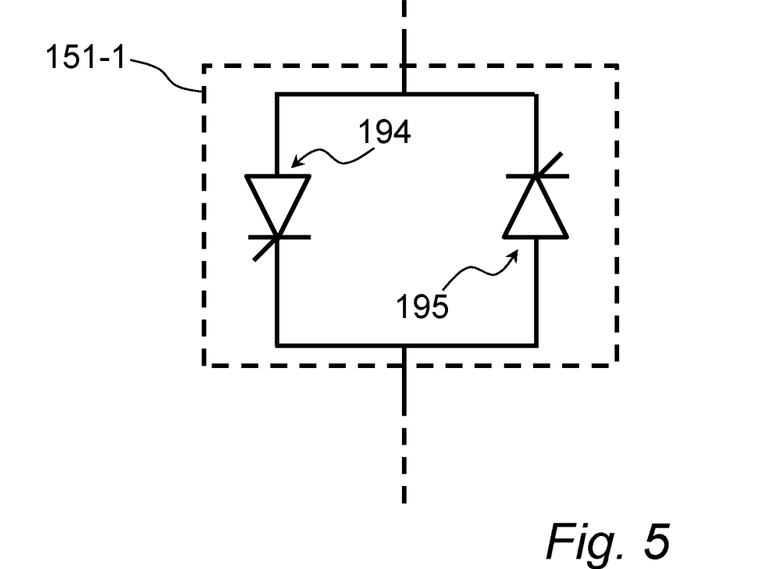
FIG. 5 is a schematic circuit diagram of a converter valve in accordance with an embodiment of the present invention.

Referring now to FIG. 5, there is shown an example configuration of the converter valve 151-1 shown in FIG. 2. It is to be understood that any one of the other converter valves 151-N, 152-1, ..., 152-N, 153-1, ..., 153-N, 154-1, ..., 154-N, 155-1, ..., 155-N, 156-1, ..., 156-N shown in FIG. 2 may be configured in the same manner or in a similar manner as the converter valve 151-1 illustrated in FIG. 5. According to the example illustrated in FIG. 5, the converter valve 151-1 includes at least two anti-parallel thyristors 194, 195. As illustrated in FIG. 5, the thyristors 194, 195 are electrically connected in parallel and have their polarities reversed with respect to each other. Thereby, the converter valve 151-1 may exhibit a capability or capacity of a controllable, bidirectional switch.

With further reference to FIGS. 1 and 2, the phase transformers 107, 108, 109 may be connected between the AC power system 102 and a midpoint of the corresponding converter valve arm 171, 172, 173 and a midpoint of the corresponding multi-level converter cell arm 161, 162, 163.

The midpoint of the multi-level converter cell arms 161, 162, 163 may be defined as being a point connecting the upper multi-level converter cell arm of the respective multi-level converter cell arm 161, 162, 163 on one side, and the lower multi-level converter cell arm of the respective multi-level converter cell arm 161, 162, 163 on the other side. For example when the multi-level converter cells in the multi-level converter cell arm 161, 162, 163 are electrically connected in series, the midpoint may be defined as a point where half or approximately half of the multi-level converter cells are provided on one side of the midpoint and the remaining ones of the multi-level converter cells are provided on the other side of the midpoint.

Similarly, the midpoint of the converter valve arms 171, 172, 173 may be defined as being a point connecting the upper converter valve arm of the respective converter valve arm 171, 172, 173 on one side, and the lower converter valve arm of the respective converter valve arm 171, 172, 173 on the other side. For example when the converter valves in the converter valve arm 171, 172, 173 are electrically connected in series, the midpoint may be defined as a point where half or approximately half of the converter valves are provided on one side of the midpoint and the remaining ones of the converter valves are provided on the other side of the midpoint.

As illustrated in FIG. 2, for any one of the converter modules 104, 105, 106, the multi-level converter cell arm 171, 172, 173 and the converter valve arm 161, 162, 163 in the respective converter module 104, 105, 106 may for example be electrically connected in parallel.

With further reference to FIG. 2, any one of the converter modules 104, 105, 106 may comprise a commutation cell 181, 182, 183 electrically connected to the respective converter valves 151-1, . . . , 151-N, 152-1, . . . , 152-N, 153-1, . . . , 153-N, 154-1, . . . , 154-N, 155-1, . . . , 155-N, 156-1, . . . , 156-N, and switchable so as to cause the respective converter valves 151-1, . . . , 151-N, 152-1, . . . , 152-N, 153-1, . . . , 153-N, 154-1, . . . , 154-N, 155-1, . . . , 155-N, 156-1, . . . , 156-N to enter the non-conducting state.

Figure 6:
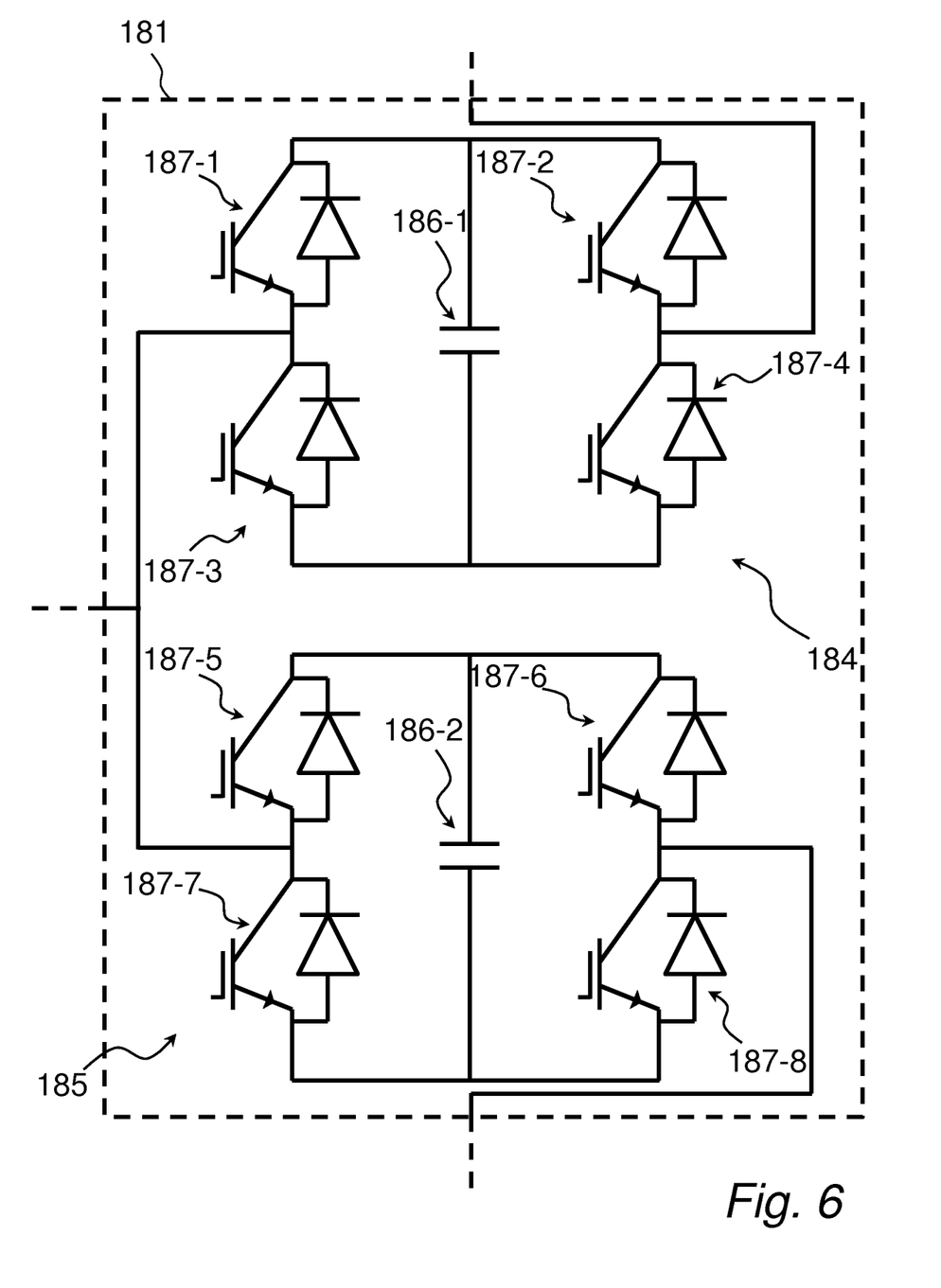
FIG. 6 is a schematic circuit diagram of a commutation cell in accordance with an embodiment of the present invention.

Referring now to FIG. 6, there is shown an example configuration of the commutation cell 181 shown in FIG. 2. It is to be understood that any one of the other commutation cells 182, 183 shown in FIG. 2 may be configured in the same manner or in a similar manner as the commutation cell 181 illustrated in FIG. 6. In general, each of the commutation cells 181, 182, 183 may include at least one electrical energy storage element, such as a capacitor, which can be selectively charged with DC power from the DC power system 102 and selectively discharged, wherein by switching of the commutation cell 181, 182, 183, it may provide a selected voltage across at least one of the thyristors 194, 195 in a converter valve 151-1, . . . , 151-N, 152-1, . . . , 152-N, 153-1, . . . , 153-N, 154-1, . . . , 154-N, 155-1, . . . , 155-N, 156-1, . . . , 156-N, and switchable so as to cause the respective converter valves 151-1, . . . , 151-N, 152-1, . . . , 152-N, 153-1, . . . , 153-N, 154-1, . . . , 154-N, 155-1, . . . , 155-N, 156-1, . . . , 156-N in order to switch the at least one thyristor 194, 195 into a non-conducting state. According to the example illustrated in FIG. 6, the commutation cell 181 comprises two electrical energy storage elements 186-1, 186-2 in the form of capacitors. Each of the capacitors 186-1, 186-2 is arranged in a corresponding full-bridge cell 184, 185 having four switching elements 187-1 to 187-4 and 187-5 to 187-8, respectively. According to the example illustrated in FIG. 6, the switching elements 187-1 to 187-8 comprise a transistor together with a diode. The transistors may for example comprise IGBTs. It is to be understood that the switching elements 187-1 to 187-8 shown in FIG. 6 are according to an example, and that other types of switching elements can be used. Thus, any one of the commutation cells 181, 182, 183 may preferably comprise a full-bridge cell, which is in accordance with the embodiment of the present invention illustrated in FIG. 6. However, this is not necessary. Any one of the commutation cells 181, 182, 183 may for example comprise a half-bridge cell. The commutation cells 181, 182, 183 are not limited to using a capacitors 186-1, 186-2 as electrical energy storage elements, but other types of electrical energy storage elements may be employed. As illustrated in FIG. 2, the commutation cells 181, 182, 183 may for example be arranged at the midpoint of the multi-level converter cell arms 161, 162, 163, respectively.

As indicated in the foregoing, the multi-level converter cells 141-1, . . . , 141-N, 142-1, . . . , 142-N, 143-1, . . . , 143-N, 144-1, . . . , 144-N, 145-1, . . . , 145-N and 146-1, . . . , 146-N of the converter modules 104, 105, 106 are configured to provide a voltage contribution to the AC voltage waveform, e.g. based on (at least) voltage of the DC power system 103. The multi-level converter cells 141-1, . . . , 141-N, 142-1, . . . , 142-N, 143-1, . . . , 143-N, 144-1, . . . , 144-N, 145-1, . . . , 145-N and 146-1, . . . , 146-N can hence be used in order to synthesize a desired AC voltage waveform in order to satisfy the requirements of either the AC power system 102 or the DC power system 103. The interface arrangement 110 can hence be operated as a Voltage Source Converter, wherein DC side voltage establishes the AC side voltage. By way of the converter cells 141-1, . . . , 141-N, 142-1, . . . , 142-N, 143-1, . . . , 143-N, 144-1, . . . , 144-N, 145-1, . . . , 145-N and 146-1, . . . , 146-N being multi-level converter cells, each multi-level converter cell 141-1, . . . , 141-N, 142-1, . . . , 142-N, 143-1, . . . , 143-N, 144-1, . . . , 144-N, 145-1, . . . , 145-N and 146-1, . . . , 146-N is configured so as to be capable of providing a multiple of voltage levels, such as two or more voltage levels, which may be used in forming the AC voltage waveform.

The forming of the AC voltage waveform by operation and control of the (components of the) converter modules 104, 105, 106 may be carried out using general principles which as such are known in the art. For each phase, depending on which of the switches or switching elements 191, 192 in each multi-level converter cell is switched on (i.e. is in a conducting state), the electrical energy storage element 193 can either be bypassed or connected into the circuit. Each multi-level converter cell can thereby act as a possibly independent, separate, controllable voltage source. In accordance with the embodiment of the present invention, the multi-level converter cell 141-1 is a two-level converter, which can generate either zero voltage or the voltage across the electrical energy storage element (e.g., a capacitor) 193. With a number of multi-level converter cells electrically connected, e.g. in series such as illustrated in FIG. 2, with the series-connected multi-level converter cells forming multi-level converter cell arms 161, 162, 163, a number of voltage levels can be provided which can be used to synthesize a stepped voltage waveform. Another way to describe this is that the voltage at the AC output of each phase may be controllably switched between a number of discrete voltage levels which are based on or correspond to the electrical potentials at the first DC pole or terminal T1 and at the second DC pole or terminal T2, $+U_d$ and $-U_d$, respectively. The polarity of voltage contributions provided by the multi-level converter cells can be controlled by the converter valves (so as to produce positive or negative voltage contributions), thereby allowing for a stepped voltage waveform to be synthesized which for example can approximate a sine wave or sinusoid.

Figure 7:
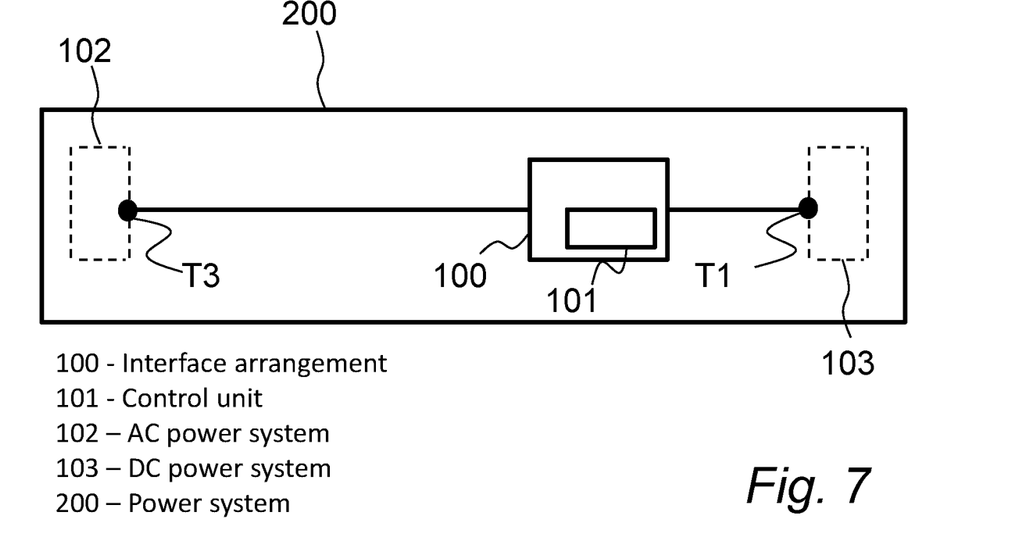
FIG. 7 is a schematic block diagram of a power system according to an embodiment of the present invention.

Referring now to FIG. 7, there is shown a schematic block diagram of a power system 200 according to an embodiment of the present invention. The power system 200 includes an AC power system 102 and a DC power system 103 coupled or connected by way of terminals T1 and T3, respectively, to an interface arrangement 100 configured to couple the AC power system 102 with the DC power system 103, or vice versa. The interface arrangement 100 may for example be configured in accordance with any one of the embodiments of the present invention described above with reference to FIGS. 1-5. As illustrated in FIG. 7, the interface arrangement 100 may comprise a control unit 101 configured to control operation of one or more other components of the interface arrangement 100. For example with reference to FIG. 2, the control unit 101 may be configured to control the converter valves 151-1, ..., 151-N, 152-1, ..., 152-N, 153-1, ..., 153-N, 154-1, ..., 154-N, 155-1, ..., 155-N, 156-1, ..., 156-N, for example with respect to switching thereof.

Figure 8:
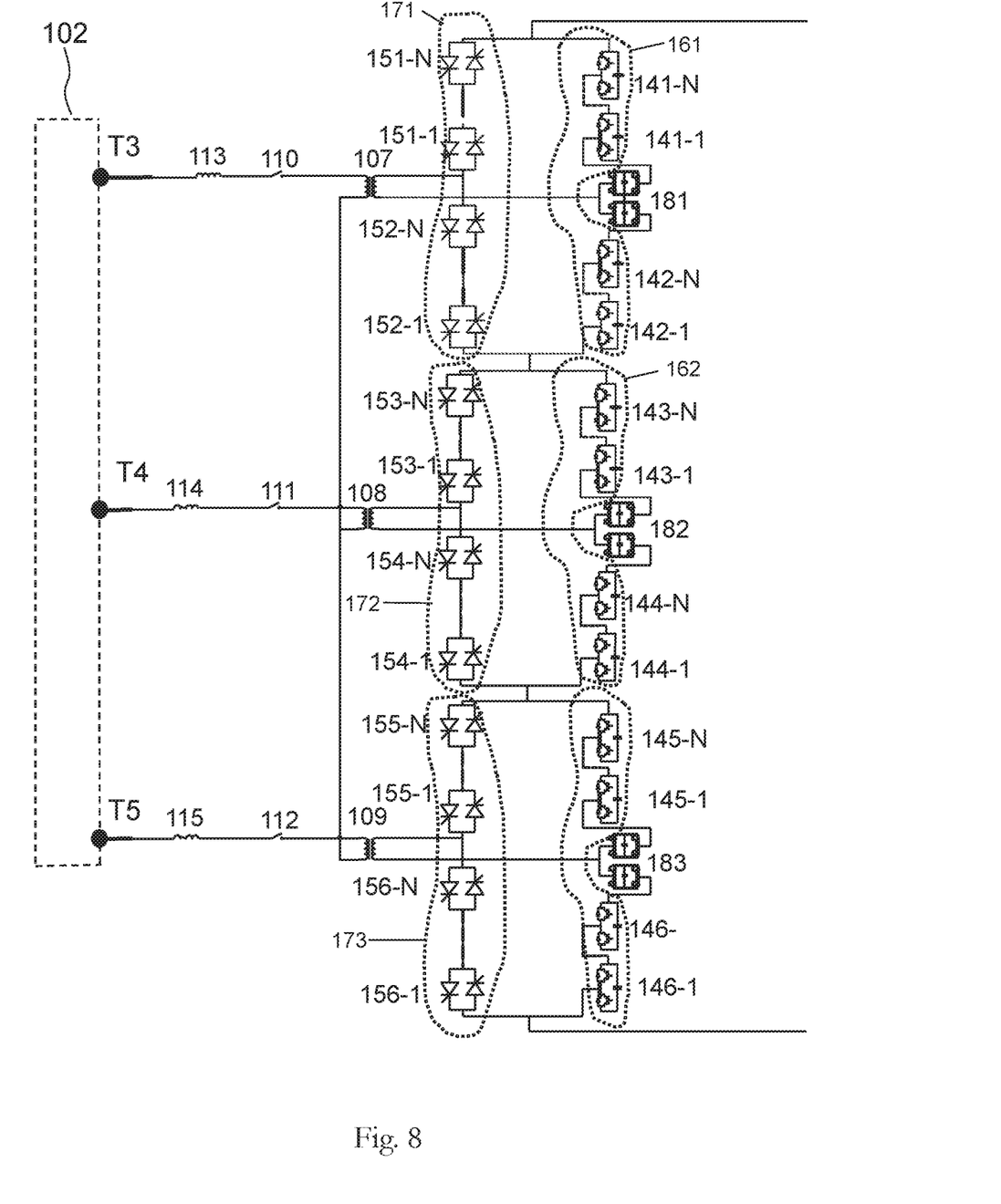
FIG. 8 is a schematic circuit diagram of an interface arrangement according to an embodiment of the present invention.

FIG. 8 is a schematic circuit diagram of the interface arrangement 100 illustrated in FIGS. 1 and 2, illustrating an exemplary configuration of the connection between the transformers 107, 108, 109 and the converter modules 104, 105, 106. As shown in FIG. 8, the converter module 104 includes a plurality of multi-level converter cells 141-1, ..., 141-N and 142-1, ..., 142-N, electrically connected in series as illustrated in FIG. 2, and arranged in a multi-level converter cell arm 161. Similarly, the converter module 105 includes a plurality of multi-level converter cells 143-1, ..., 143-N and 144-1, ..., 144-N, electrically connected in series as illustrated in FIG. 2, and arranged in a multi-level converter cell arm 162. The converter module 106 may include a plurality of multi-level converter cells 145-1, ..., 145-N and 146-1, ..., 146-N, electrically connected, e.g. in series as illustrated in FIG. 2, and arranged in a multi-level converter cell arm 163. Each of the plurality of multi-level converter cells 141-1, ..., 141-N and 142-1, ..., 142-N, the plurality of multi-level converter cells 143-1, ..., 143-N and 144-1, ..., 144-N and the plurality of multi-level converter cells 145-1, ..., 145-N and 146-1, ..., 146-N comprises two switches or switching elements 191, 192 and a capacitor 193 as illustrated in FIG. 3. The converter module 104 includes a plurality of converter valves 151-1, ..., 151-N and 152-1, ..., 152-N electrically connected in series as illustrated in FIG. 2, and arranged in a converter valve arm 171. Similarly, the converter module 105 includes a plurality of converter valves 153-1, ..., 153-N and 154-1, ..., 154-N electrically connected in series as illustrated in FIG. 2, and arranged in a converter valve arm 172. Similarly, the converter module 106 includes a plurality of converter valves 155-1, ..., 155-N and 156-1, ..., 156-N electrically connected in series as illustrated in FIG. 2, and arranged in a converter valve arm 173. Each of the plurality of converter valves 151-1, ..., 151-N and 152-1, ..., 152-N, the plurality of converter valves 153-1, ..., 153-N and 154-1, ..., 154-N and plurality of converter valves 155-1, ..., 155-N and 156-1, ..., 156-N includes at least two anti-parallel thyristors 194, 195. The phase transformers 107, 108, 109 are connected to the AC power system 102 through the reactors or inductors 113, 114, 115, respectively with the respective phase circuit breakers 110, 111, 112. The phase transformers 107, 108, 109 are connected between the reactors or inductors 113, 114, 115 that are connected to the AC power system 102 and a midpoint of the corresponding converter valve arm 171, 172, 173 and a midpoint of the corresponding multi-level converter cell arm 161, 162, 163.

In conclusion, an interface arrangement configured to couple an AC power system with a DC power system, or vice versa, is disclosed. The interface arrangement comprises a plurality of series-connected converter modules. Each converter module comprises at least one multi-level converter cell configured to provide a voltage contribution to at least a portion of an AC waveform for example based on voltage of the DC power system. Each converter module comprises at least one converter valve, electrically connected to the at least one multi-level converter cell and including at least two anti-parallel thyristors. The at least one converter valve is controllably switchable between conducting states with a selected current conduction direction and a non-conducting state so as to selectively control polarity of any voltage contribution provided by the at least one multi-level converter cell.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An interface arrangement configured to couple an alternating current, AC, power system comprising a plurality of phases with a direct current, DC, power system, the interface arrangement comprising:
   a plurality of converter modules for conversion of DC power to AC power, or vice versa, electrically connected in series, each converter module corresponding to only one of the phases but not corresponding to the other one(s) of the phases, such that there is a one-to-one correspondence between the converter modules and the phases, and each converter module being configured to provide at least a portion of an AC waveform, and each converter module comprising:
      at least one multi-level converter cell, each multi-level converter cell configured to provide a voltage contribution to the AC waveform based on voltage of the DC power system; and
      at least one converter valve electrically connected to the at least one multi-level converter cell, wherein the interface arrangement is configured such that the at least one converter valve is controllably switchable between conducting states with a selected current conduction direction and a non-conducting state, wherein the at least one converter valve includes at least two anti-parallel thyristors; and
   a control unit configured to control operation of the at least one converter valve at least with respect to switching, said control with respect to the switching comprising selectively controlling polarity of any voltage contribution provided by the at least one multi-level converter cell, wherein the control unit is configured to, in response to receiving an indication indicating presence of a fault current in the interface arrangement, control switching of the at least one converter valve so as to route the fault current through the at least one converter valve and bypass at least one of the at least one multi-level converter cell,
   wherein each converter module comprises:
      a plurality of multi-level converter cells electrically connected in a multi-level converter cell arm; and
      a plurality of converter valves electrically connected in a converter valve arm, wherein the multi-level converter cell arm and the converter valve arm are electrically connected in parallel, and wherein the interface arrangement further comprises at least one transformer connected between the AC power system and a midpoint of the converter valve arm and a midpoint of the multi-level converter cell arm.

2. The interface arrangement according to claim 1, each converter module further comprising at least one commutation cell electrically connected to the at least one converter valve and switchable so as to selectively cause the at least one converter valve to enter the non-conducting state.

3. The interface arrangement according to claim 2, wherein the at least one commutation cell comprises at least one electrical energy storage element which can be selectively charged with DC power from the DC power system and selectively discharged, wherein by switching of the commutation cell it may provide a selected voltage across at least one of the thyristors in order to switch the at least one thyristor into a non-conducting state.

4. The interface arrangement according to claim 3, wherein the at least one commutation cell comprises a full-bridge cell.

5. The interface arrangement according to claim 3, each multi-level converter cell comprising at least one electrical energy storage element which can be selectively charged with DC power from the DC power system and selectively discharged, each multi-level converter cell configured to provide a voltage contribution to the AC voltage waveform based on a voltage of the electrical energy storage element.

6. The interface arrangement according to claim 2, wherein the at least one commutation cell comprises a full-bridge cell.

7. The interface arrangement according to claim 6, each multi-level converter cell comprising at least one electrical energy storage element which can be selectively charged with DC power from the DC power system and selectively discharged, each multi-level converter cell configured to provide a voltage contribution to the AC voltage waveform based on a voltage of the electrical energy storage element.

8. The interface arrangement according to claim 2,
wherein each converter module comprises a plurality of multi-level converter cells electrically connected in a multi-level converter cell arm,
wherein at least one of the multi-level converter cells in the multi-level converter cell arm comprises a full-bridge cell, and
wherein the at least one commutation cell comprises or is constituted by the at least one multi-level converter cell which comprises a full-bridge cell.

9. The interface arrangement according to claim 8, wherein each of the plurality of multi-level converter cells in the multi-level converter cell arm comprises a full-bridge cell, and wherein the at least one commutation cell comprises or is constituted by any one of the multi-level converter cells in the multi-level converter cell arm.

10. The interface arrangement according to claim 2, each multi-level converter cell comprising at least one electrical energy storage element which can be selectively charged with DC power from the DC power system and selectively discharged, each multi-level converter cell configured to provide a voltage contribution to the AC voltage waveform based on a voltage of the electrical energy storage element.

11. The interface arrangement according to claim 2, wherein each converter module has a first terminal and a second terminal, the second terminal of a first one of the converter modules is directly connected to the first terminal of a second one of the converter modules, the second terminal of the second one of the converter modules is directly connected to the first terminal of a third one of the converter modules, the first terminal of the first one of the converter modules is directly connected to a first DC pole of the DC power system, and the second terminal of the third one of the converter modules is directly connected to ground or to a second DC pole of the DC power system.

12. The interface arrangement according to claim 1, each multi-level converter cell comprising at least one electrical energy storage element which can be selectively charged with DC power from the DC power system and selectively discharged, each multi-level converter cell configured to provide a voltage contribution to the AC voltage waveform based on a voltage of the electrical energy storage element.

13. The interface arrangement according to claim 1, wherein the plurality of converter modules are electrically connected in series between a first DC pole and a second DC pole, or between a DC pole and ground.

14. The interface arrangement according to claim 13, wherein the control unit is configured to, in response to receiving an indication indicating presence of a fault current in the interface arrangement caused by a fault at one of the first DC pole and the second DC pole, control switching of the at least one converter valve so as to route the fault current from the one of the first DC pole and the second DC pole at which there is a fault through the at least one converter valve to the other one of the first DC pole and the second DC pole, wherein the at least one of the at least one multi-level converter cell is bypassed.

15. The interface arrangement according to claim 1, wherein the at least one multi-level converter cell comprises a half-bridge cell or a full-bridge cell.

16. A converter station configured to couple an alternating current power system with a direct current power system, the converter station comprising the interface arrangement according to claim 1.

17. A power system including an alternating current, AC, power system and a direct current, DC, power system, the power system comprising the interface arrangement according to claim 1 configured to couple the AC power system with the DC power system.

* * * * *